(12) United States Patent
Wu

(10) Patent No.: US 6,357,817 B1
(45) Date of Patent: Mar. 19, 2002

(54) FAST-DISMOUNTABLE COVERING PANEL FOR AN ELECTRIC CART

(75) Inventor: Donald P. H. Wu, Hsinchu Hsien (TW)

(73) Assignee: Pihsiang Machinery Co., Ltd., Hsinchu (TW)

( * ) Notice: Subject to any disclaimer, the term of this patent is extended or adjusted under 35 U.S.C. 154(b) by 0 days.

(21) Appl. No.: 09/678,116

(22) Filed: Oct. 2, 2000

(51) Int. Cl.[7] .............................. B60J 1/00; B60J 7/00; B60K 37/00; B60N 2/00; B60N 3/00
(52) U.S. Cl. ...................................... 296/177
(58) Field of Search ............................. 296/177, 35.1; 180/210, 215, 216, 65.1, 908

(56) References Cited

U.S. PATENT DOCUMENTS

| 5,036,938 A | * | 8/1991 | Blount et al. |
| 5,503,243 A | * | 4/1996 | Kruse |
| 6,170,592 B1 | * | 1/2001 | Wu |

* cited by examiner

*Primary Examiner*—Joseph D. Pape
*Assistant Examiner*—Scott Carpenter
(74) *Attorney, Agent, or Firm*—Pro-Techtor International Services

(57) ABSTRACT

A fast-dismountable covering panel for mounting on a chassis of an electric cart is provided. The covering panel includes a front round opening and a rearward opened elongate opening opposite to the round opening. The elongate opening is adapted to engage with a handlebar stem upward extended from a front end of the chassis. A very narrow slit is provided along a centerline of the covering panel to extend between the round opening and the elongate opening, allowing the covering panel to be elastically stretched apart at the elongate opening along the slit for the handlebar stem to move forward along the slit into the round opening and causing the covering panel to cover and be screwed to a top of the chassis. A gasket is removably engaged with the slit to seal the same. Footrest panel, mat fixing strips and mat may be detachably connected to the covering panel and the covering panel may be mounted onto the chassis after the latter has been fully assembled and passed quality inspection. When necessary, the covering panel may also be quickly dismounted from the chassis by stretching it apart along the slit.

12 Claims, 12 Drawing Sheets

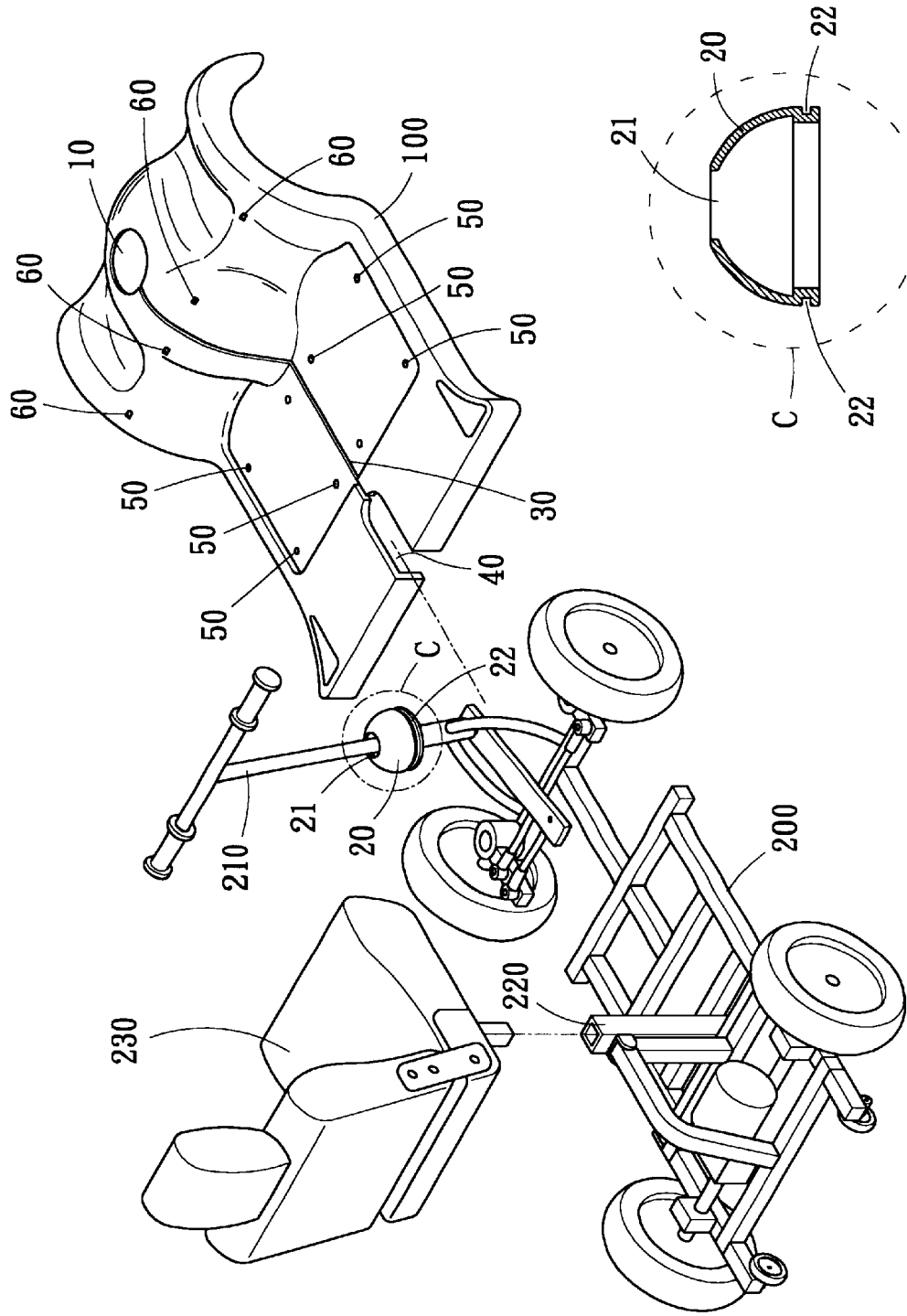
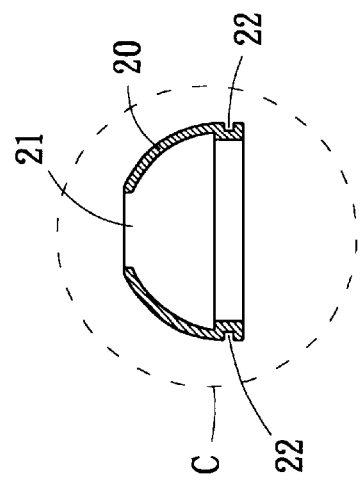
Fig. 1
Fig. 2

FAST-DISMOUNTABLE COVERING PANEL FOR AN ELECTRIC CART

FIELD OF THE INVENTION

The present invention relates to a fast-dismountable covering panel for an electric cart, and more particularly to an electric cart covering panel having a longitudinal slit for the covering panel to be elastically stretched apart along the slit and thereby facilitate quick mounting and dismounting of the covering panel onto and from the electric cart.

BACKGROUND OF THE INVENTION

Cars have become very important traffic means in the modern society, particular in cities. With the increasing requirement for environmental protection, there is also developed a four-wheel electric cart that not only enables reduced environmental pollution but also has reduced dimensions and weight compared with the common cars and motorcycles. Such electric cart can be easily operated and is therefore widely welcome and employed by the invalid and the aged to conveniently assist them in moving usually within a short distance.

For the electric cart to have various and beautiful appearance, differently designed and colored covering panels are provided for mounting onto a top of a chassis of the electric cart. FIGS. 13 and 14 illustrate a conventional electric cart A, a covering panel A1 and a chassis A2 of which are so designed that they must be assembled together in the process of manufacturing the electric cart. And, a handlebar A3 of the electric cart and a decorative cover A4 thereof could be connected to related mechanisms in the chassis only when the covering panel A1 has been assembled to the chassis. Similarly, other parts, such as brake cable, electric control wiring and the like having close connection with the handlebar A3, could not be sequentially installed along with the handlebar A3 until the covering panel has been mounted onto the chassis. As a result, the manufacture and assembling of the electric cart A is difficult and troublesome and requires a lot of time and labor.

Moreover, the conventional electric cart A is sent for quality inspection in a completely assembled state. That is, the electric cart A is inspected for quality with the covering panel A1 fully mounted onto the chassis A2 and the power mechanism, electric wiring, braking mechanism thereof completely installed in the chassis A2. The fully assembled electric cart A has a considerable weight that forms a hindrance in hoisting or sideward turning the cart for the purpose of quality inspection. The covering panel A1 tends to be scraped or otherwise damaged during such quality inspection. In the event the chassis A2 or other mechanism or wiring installed in the chassis is found unqualified in the quality inspection and must be dismounted and replaced, it would be inevitable to sequentially dismount the decorative cover A4, the handlebar A3 and the covering panel A1 from the chassis A2 before such internal mechanism or wiring can be checked, repaired or replaced. And, the covering panel A1, the handlebar A3 and the decorative cover A4 must be sequentially assembled to the chassis A2 again when the unqualified parts are repaired or replaced. The troublesome mounting and dismounting of the covering panel A1 to the chassis A2 obviously increases the manufacturing costs of the electric cart A.

Another problem with the conventional electric cart A is the covering panel A1 and the chassis A2 that are assembled together during the production of the electric cart A would disadvantageously necessitate time and labor consumed replacement of the covering panel in the above-mentioned troublesome procedures when a buyer prefers to a covering panel of different color or style. This obviously does not meet the requirement of efficiency in the industrial field.

Moreover, it is very possible that a second time mistake in the installation of the related brake cable and/or electric wiring occurs when the decorative cover A4, the handlebar A3 and the covering panel A1 are repeatedly dismounted and mounted. This would also form a factor disadvantageously affecting the quality of the electric cart A.

SUMMARY OF THE INVENTION

It is therefore a primary object of the present invention to provide a fast-dismountable covering panel for easily mounting onto and dismounting from a chassis of an electric cart.

In one aspect of the present invention, the covering panel is provided along a centerline with a slit, so that the covering panel is elastically stretchable apart along the slit for conveniently covering it onto the chassis after the chassis and the related parts and wirings have been fully assembled and inspected for quality. Time and labor needed for manufacturing and QC inspection of the electric cart can therefore be largely reduced.

In another aspect of the present invention, the covering panel is provided along a centerline with a slit and at a front end of the slit with a round opening for a handlebar stem of the electric cart to move through the elastically stretched slit and engage into the round opening. That is, the handlebar stem can be assembled to the chassis before the covering panel is mounted onto the chassis, and any possible dismounting of the covering panel could be performed independently of the handlebar.

In a still another aspect of the present invention, the covering panel is provided along a centerline with a slit that allows the covering panel to be elastically stretched apart along the slit to enable easy and fast dismounting and replacement of the covering panel with another one to freely give the electric cart different color or style to attract more buyers.

To achieve the above and other objects, the fast-dismountable covering panel for an electric cart according to the present invention includes a front round opening and a rearward opened elongate opening opposite to the round opening. The elongate opening is adapted to engage with a handlebar stem upward extended from a front end of the chassis. A very narrow slit is provided along a centerline of the covering panel to extend between the round opening and the elongate opening, allowing the covering panel to be elastically stretched apart at the elongate opening along the slit for the handlebar stem to move forward along the slit into the round opening and causing the covering panel to cover and be screwed to a top of the chassis. A gasket is removably engaged with the slit to seal the same. Footrest panel, mat fixing strips and mat may be detachably connected to the covering panel and the covering panel may be mounted onto the chassis after the latter has been fully assembled and passed quality inspection. When necessary, the covering panel may also be quickly dismounted from the chassis by stretching it apart along the slit.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1 is an exploded perspective of an electric cart having a chassis and a fast-dismountable covering panel according to the present invention;

FIG. 2 is an enlarged sectional view of the circled area indicated by letter "C" in FIG. 1;

DETAILED DESCRIPTION OF THE PREFERRED EMBODIMENTS

Figure 3:
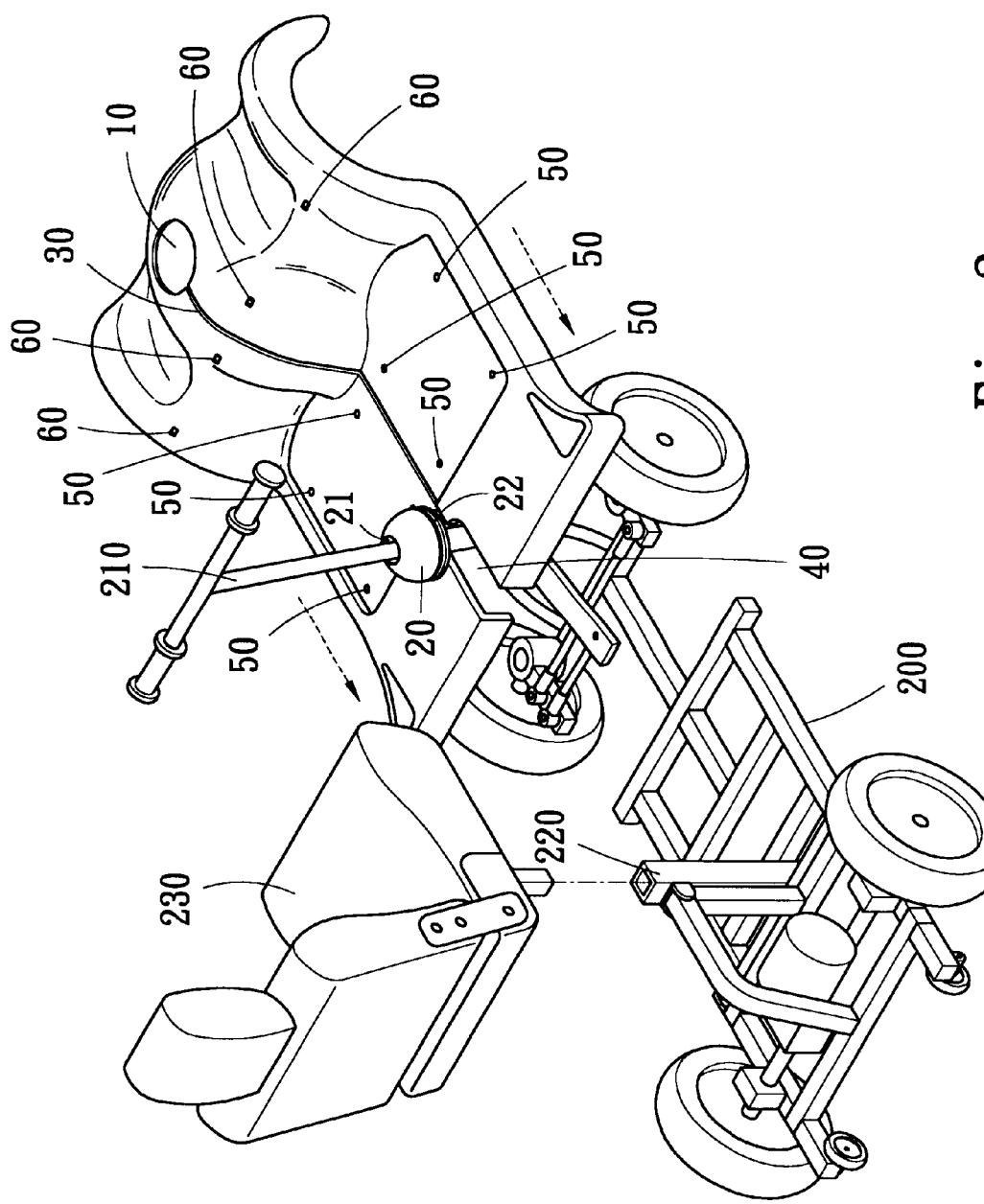
FIG. 3 is a perspective showing the mounting of the fast-dismountable covering panel of the present invention onto the chassis of the electric cart of FIG. 1.

Please refer to FIG. 1 that shows an electric cart having a fast-dismountable covering panel 100 according to an embodiment of the present invention and a chassis 200 onto which the fast-dismountable covering panel 100 is mounted. For the purpose of clarity and simplicity, the fast-dismountable covering panel 100 shall be referred to as the covering panel 100 hereinafter. The covering panel 100 may be differently designed. In the following description, the covering panel 100 is designed for mounting on to a chassis 200 for a four-wheel electric cart. However, it is understood that the covering panel 100 illustrated in the accompanying drawings is only a non-limiting example of the present invention.

As shown, the covering panel 100 includes a raised front portion that is provided at a top central area with a round opening 10 for engaging with a handlebar stem 210 of the chassis 200. A firm engagement of the handlebar stem 210 with the round opening 10 is achieved via a coupler 20. FIG. 2 is an enlarged sectional view of the coupler 20. As shown, the coupler 20 is a hollow member having a top hole 21 through which the handlebar stem 210 extends. The coupler 20 is mounted around the handlebar stem 210 during assembling of the chassis 200. At least one annular groove 22 is provided around a lower outer periphery of the coupler 20 for fitly receiving a circular edge of the round opening 10 in the annular groove 22.

The covering panel 100 also includes a substantially flat rear portion that rearward extends from a lower rear end of the raised front portion. A part of the flat rear portion of the covering panel 100 opposite to the round opening 10 is cut away to form a rearward opened elongate opening 40. The elongate opening 40 has shape and dimensions corresponding to that of a main post 220 of the chassis 200 for supporting a seat 230 thereon. A very narrow slit 30 is provided along a centerline of the covering panel 100 to extend between the round opening 10 and the elongate opening 40. With the slit 30, portions of the covering panel 100 at two sides of the slit 30 can be flexibly outward separated apart to some extent. A plurality of mounting holes 50 and 60 are provided on the rear and the front portions, respectively, of the covering panel 100 to facilitate connection of the covering panel 100 to the chassis 200 and other components to the covering panel 100 with screws or other fastening means extended through the mounting holes 50, 60.

Figure 4:
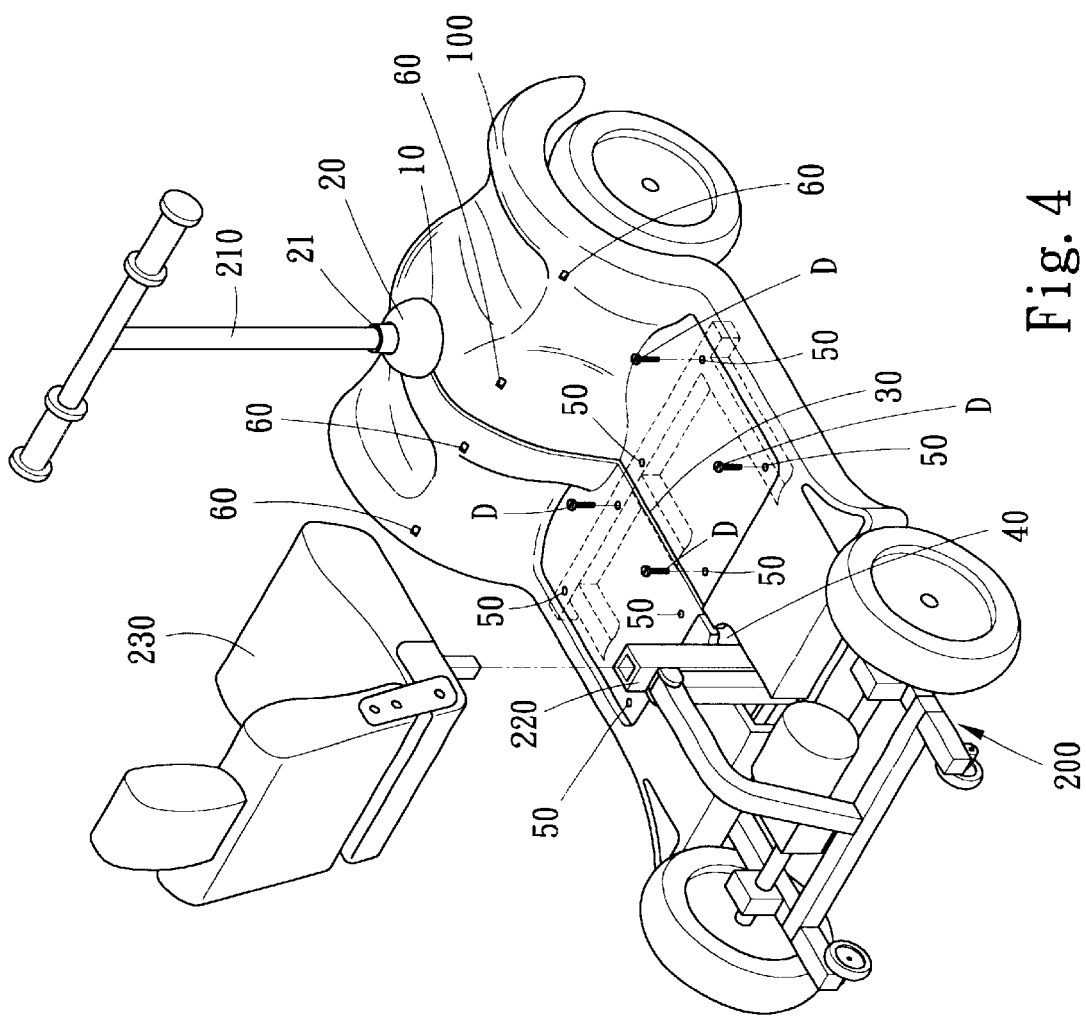
FIG. 4 is a perspective showing the fast-dismountable covering panel of the present invention is mounted and fixed to the chassis of the electric cart.

Please refer to FIGS. 3 and 4. To mount the covering panel 100 onto the chassis 200, first align the elongate opening 40 on the covering panel 100 with the handlebar stem 210 at the front of the chassis 200 and move the covering panel 100 in a direction as indicated by the broken arrows in FIG. 3, so that the handlebar stem 210 is located in the elongate opening 40. Thereafter, apply a suitable force to elastically separate the portions of the covering panel 100 at two sides of the slit 30 apart, so that the covering panel is allowed to move further for the handlebar stem 210 to locate in the round opening 10. At this point, release the covering panel 100 and the same would automatically elastically return to its original shape to cover most part of the chassis 200 in front of two rear wheels of the electric cart with the circular edge of the round opening 10 engaging into the annular groove 22 of the coupler 20 and the main post 220 locating in the elongate opening 40, as shown in FIG. 4. The covering panel 100 and the handlebar stem 210 are thereby quickly and firmly associated with each other.

Figure 5:
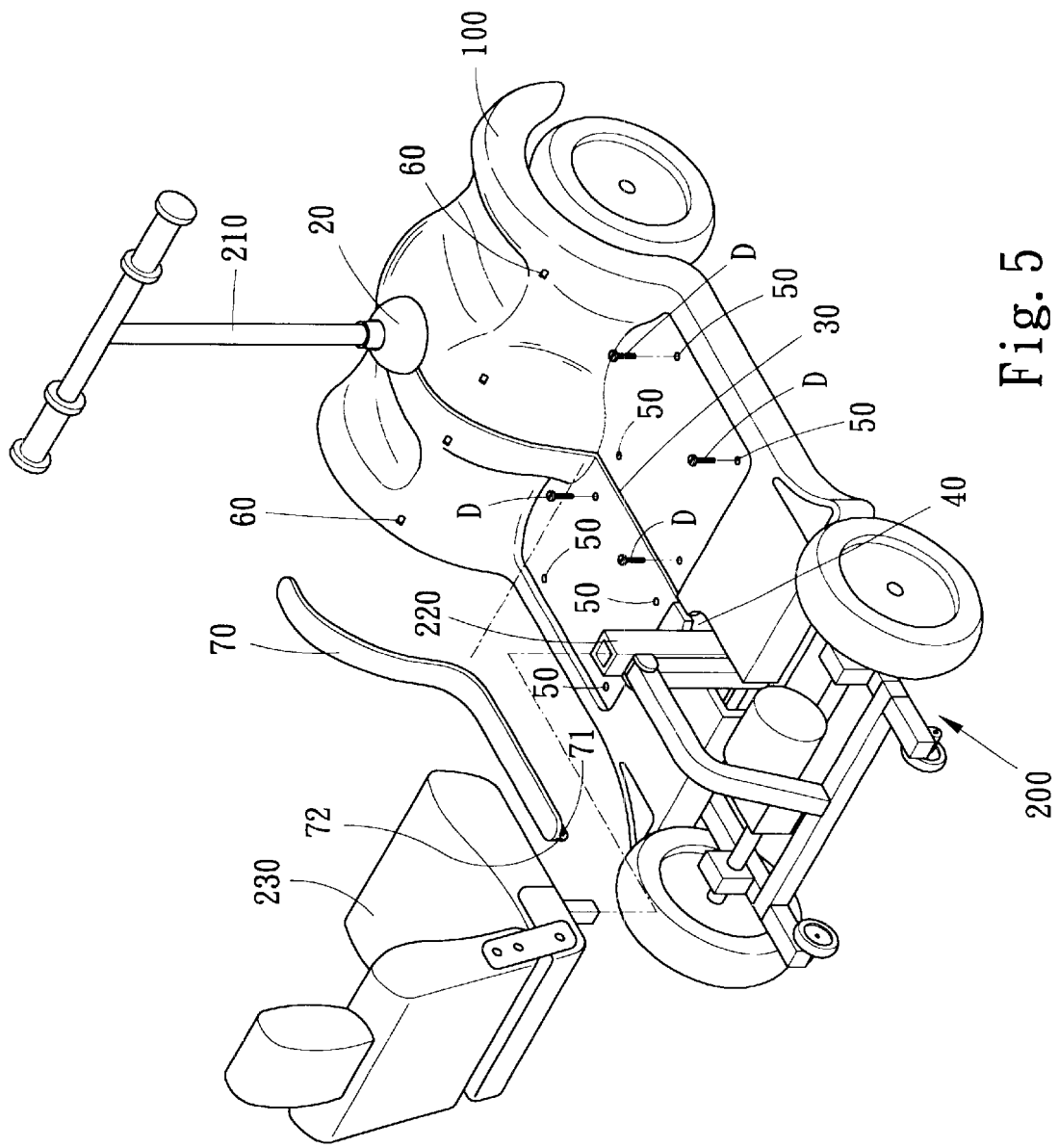
FIG. 5 is a perspective similar to FIG. 4 showing a gasket is used to set in a central slit provided on the fast-dismountable covering panel.
Figure 6:
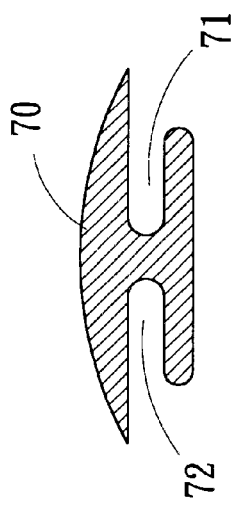
FIG. 6 is an enlarged sectional view of the gasket shown in FIG. 5.
Figure 7:
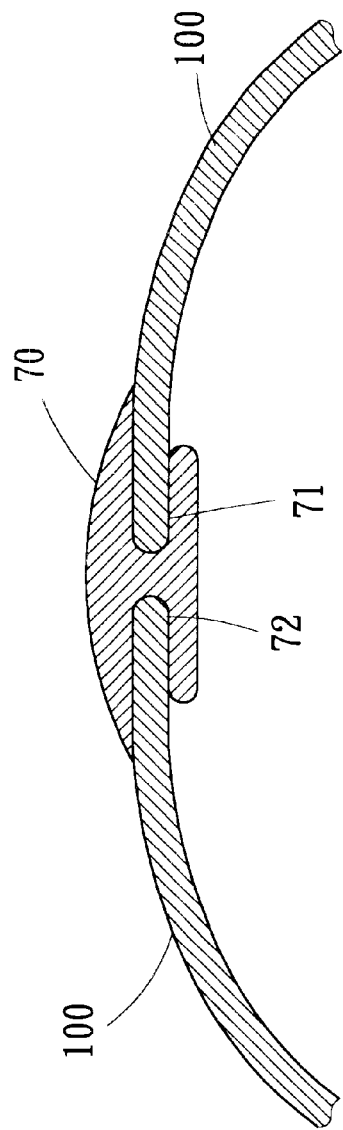
FIG. 7 is a fragmentary, enlarged sectional view showing the engagement of the gasket with the central slit on the fast-dismountable covering panel.

After the covering panel 100 is primarily assembled to the chassis 200 as illustrated in FIGS. 3 and 4, a gasket 70 is set into the slit 30 to seal the same and to ensure integrity of the appearance and fully sealed structure of the covering panel 100. FIG. 5 shows the manner of mounting the gasket 70 onto the covering panel 100. The gasket 70 may be of any shape. In the illustrated embodiment of the present invention, the gasket 70 has an I-shaped cross section to define at two sides two longitudinal grooves 71, 72, as shown in FIG. 6. The gasket 70 may be set in the slit 30 by elastically separating the covering panel 100 apart along the slit 30, such that two edges of the covering panel 100 at two sides of the slit 30 fitly engage into the two longitudinal grooves 71, 72 of the gasket 70, as shown in FIG. 7. When the covering panel 100 is allowed to elastically return to its original shape, the gasket 70 will completely seal the slit 30. After the gasket 70 has been fitted in the slit 30, the covering panel 100 is fixedly connected to the chassis 200 by aligning mounting holes 50 on the flat rear portion of the covering panel 100 with holes (not shown) on the chassis and threading, for example, screws D into the aligned mounting holes, as shown in FIG. 5.

Figure 8:
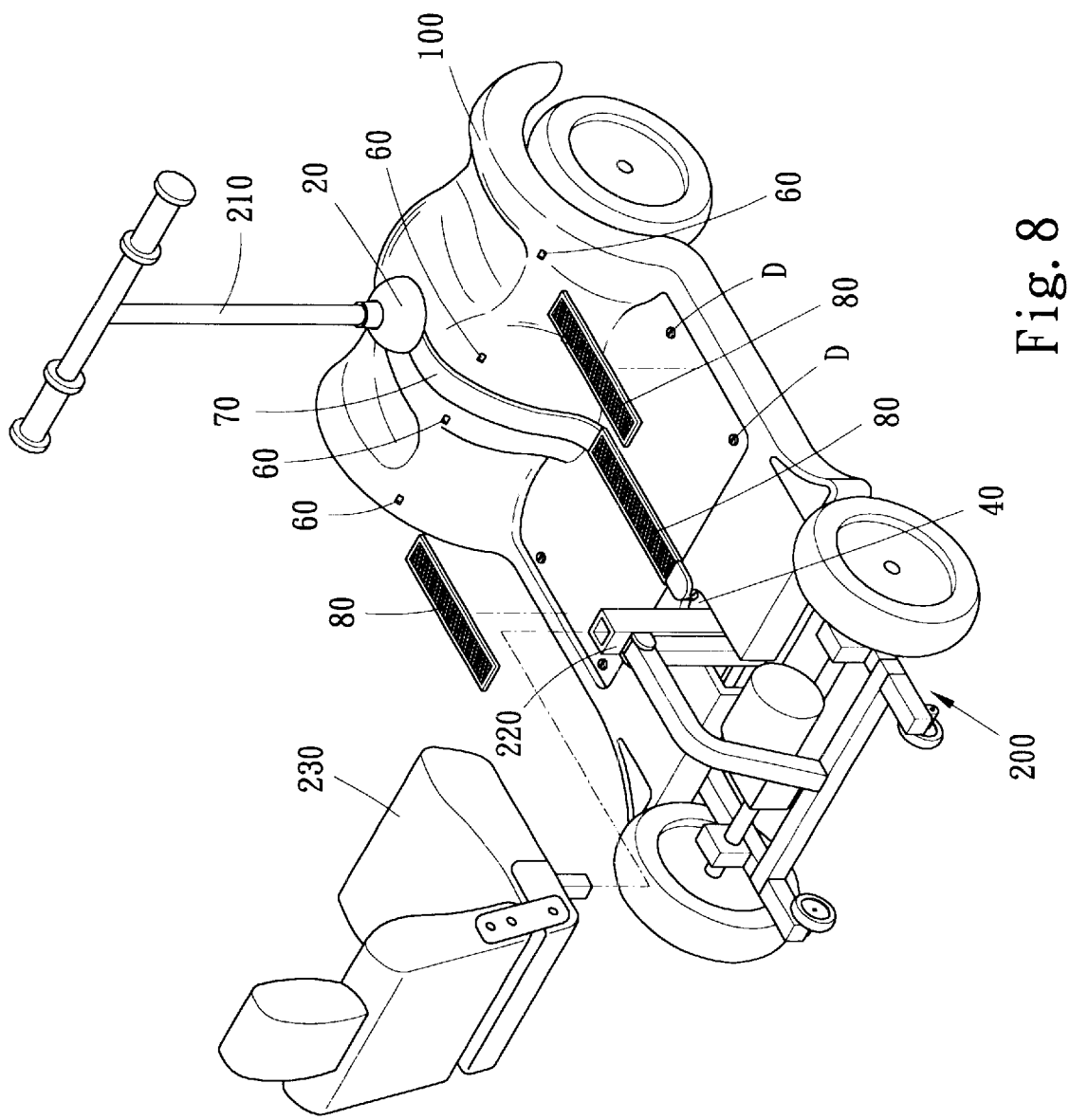
FIG. 8 is a perspective showing the manner of connecting mat fixing strips on the fast-dismountable covering panel of the present invention.
Figure 9:
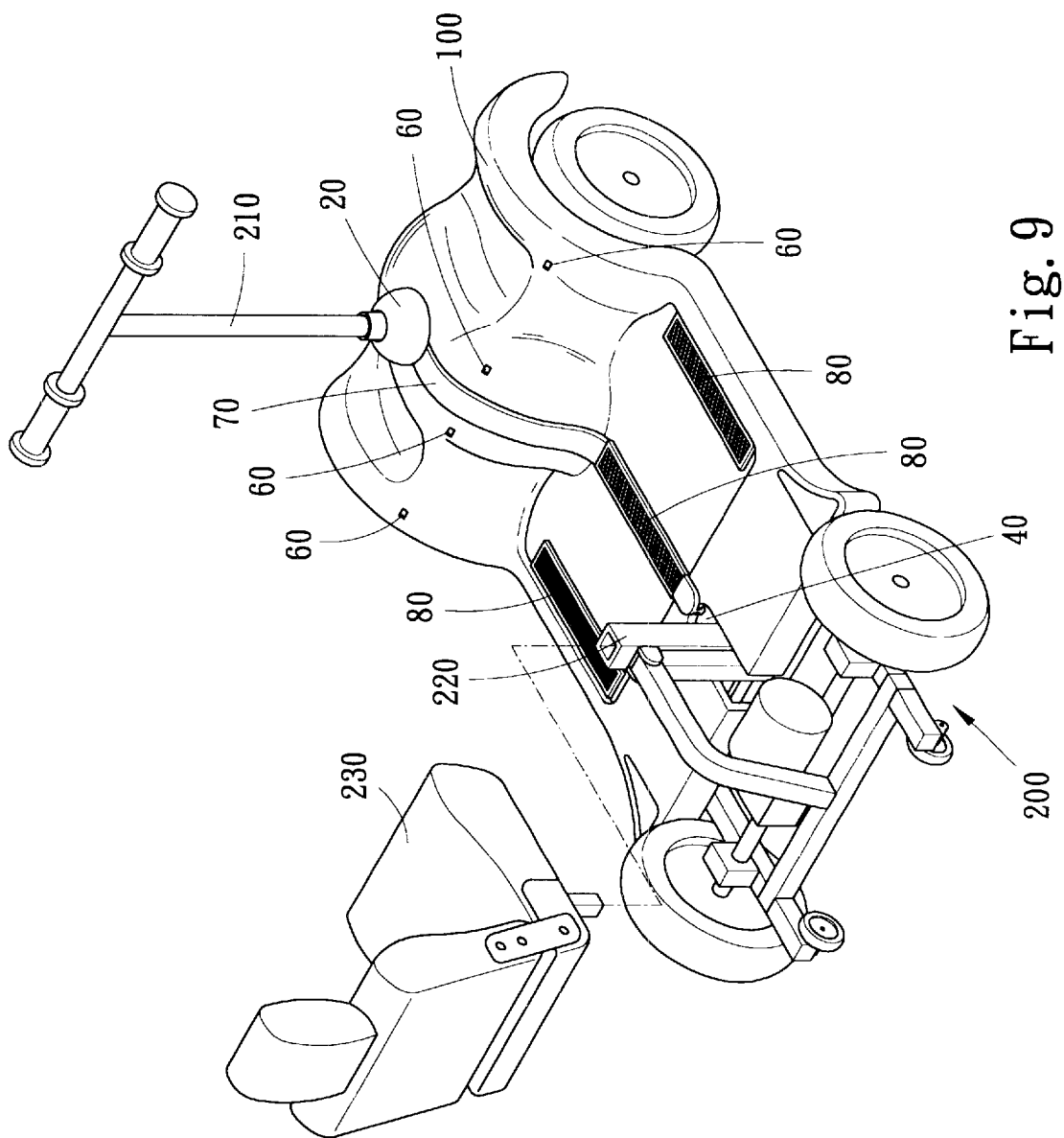
FIG. 9 is similar to FIG. 8 with the mat fixing strips fully connected to the fast-dismountable covering panel.

After the covering panel 100 is fixed to the chassis 200 with screws D, a number of mat fixing strips 80 may be connected to the covering panel 100 at positions in front of the seat 230, as shown in FIGS. 8 and 9. The mat fixing strips 80 may be of any shape and style. In the illustrated embodiment of the present invention, the mat fixing strips 80 are hook and loop connecting strips. The mat fixing strips 80 may be connected to the covering panel 100 via many different means, such as adhesive, nails, screws or the like.

Figure 10:
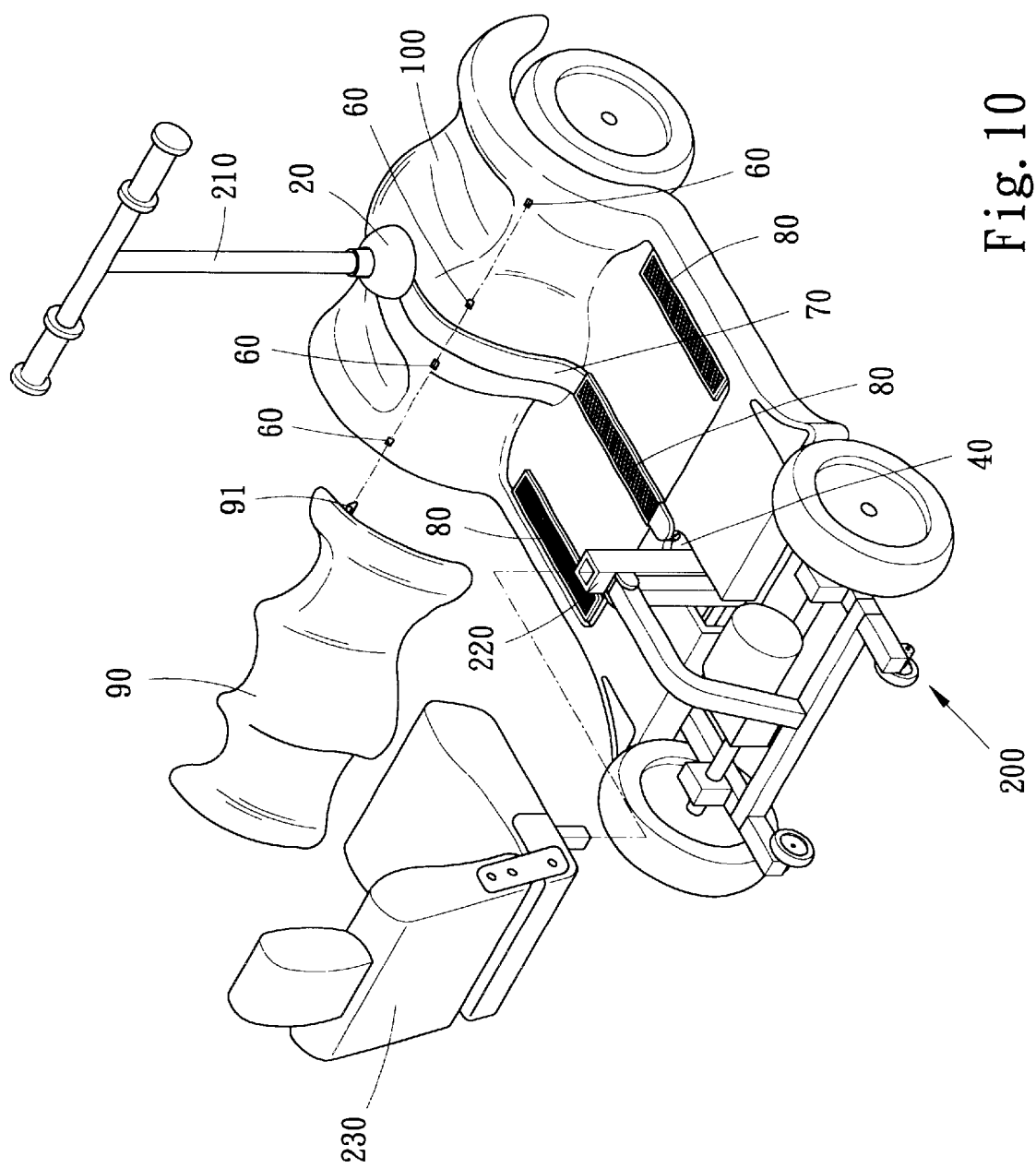
FIG. 10 is a perspective showing the manner of connecting a footrest panel to the fast-dismountable covering panel of the present invention.
Figure 11:
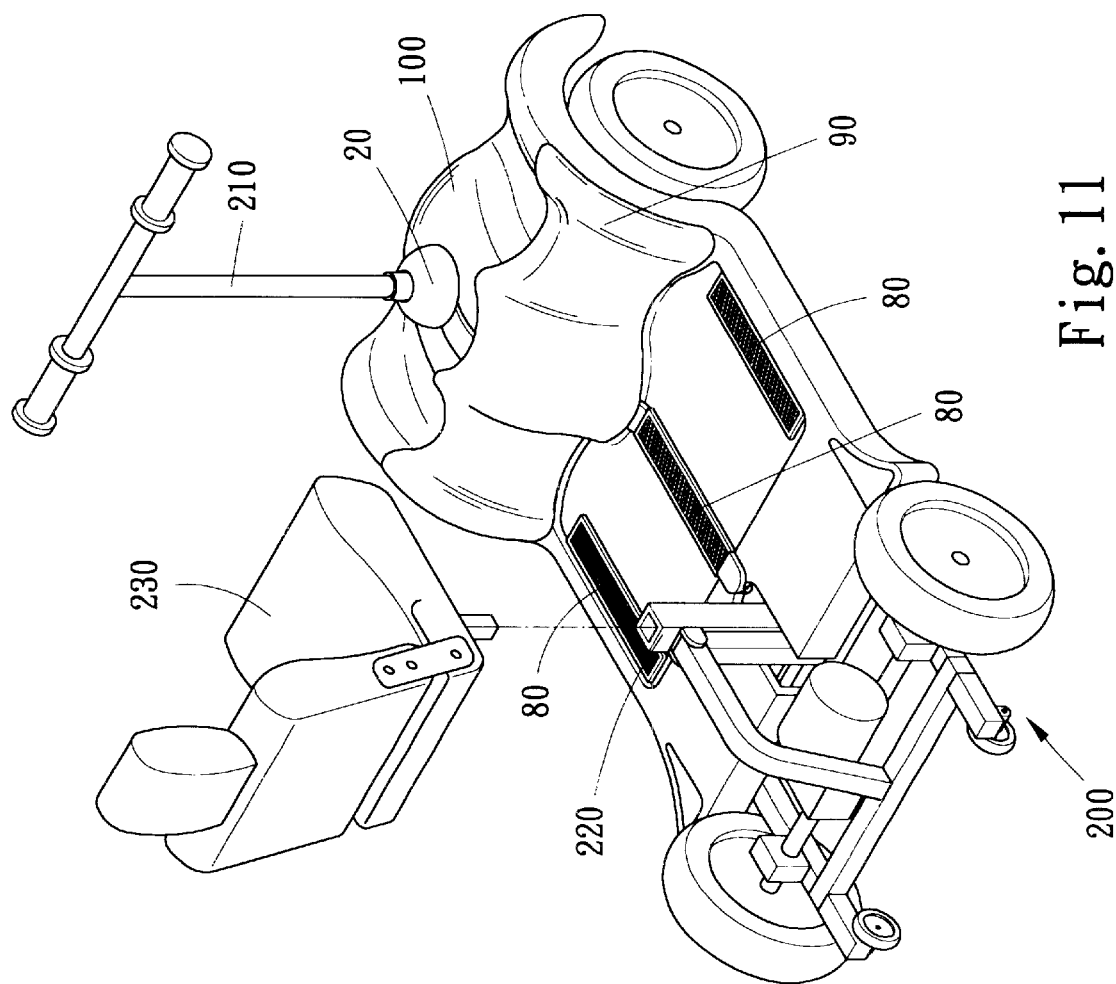
FIG. 11 is similar to FIG. 10 with the footrest panel fully connected to the fast-dismountable covering panel.
Figure 12:
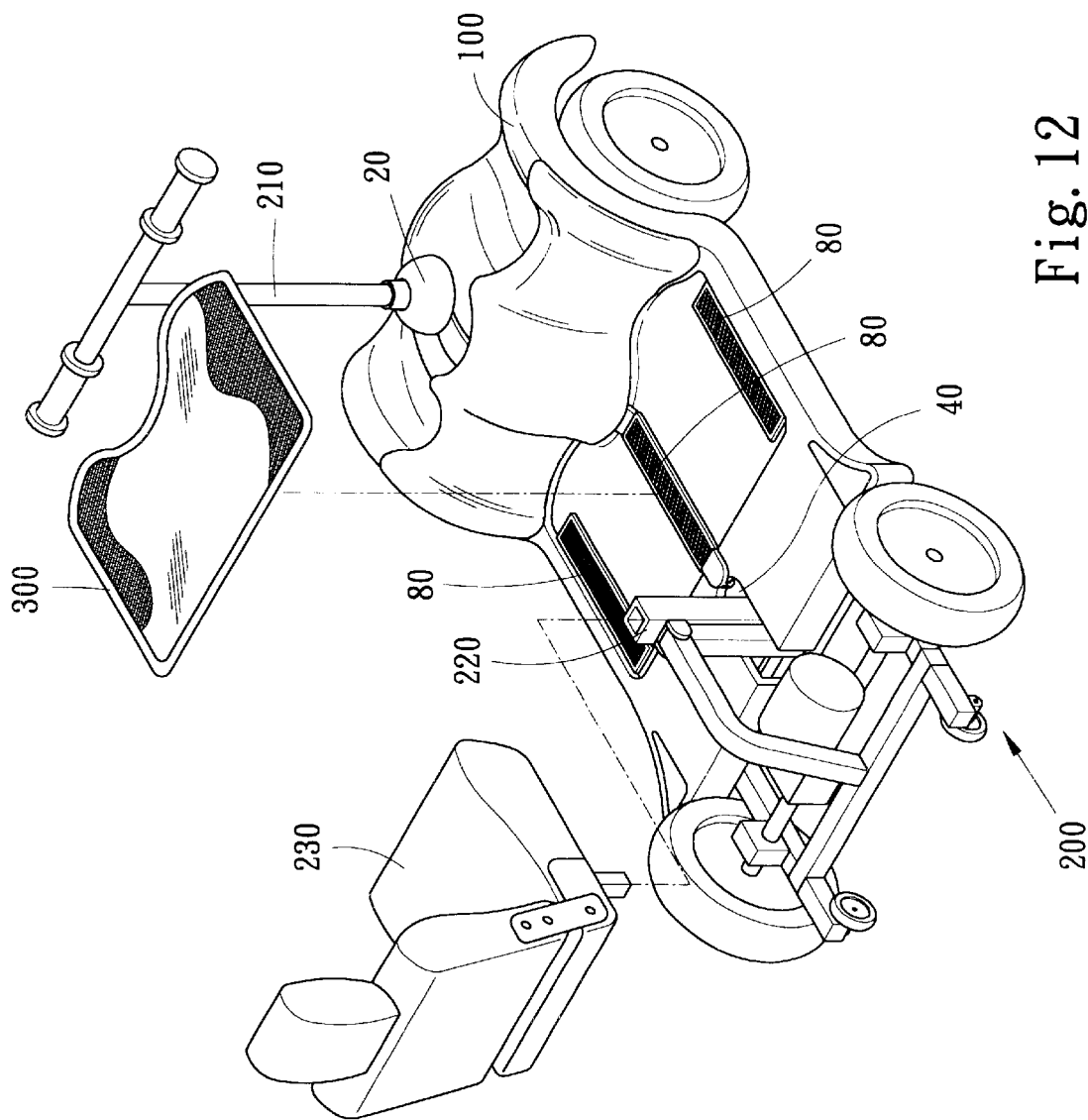
FIG. 12 is a perspective showing the manner of attaching a mat to the fast-dismountable covering panel via the mat fixing strips connected thereto.
Figure 13:
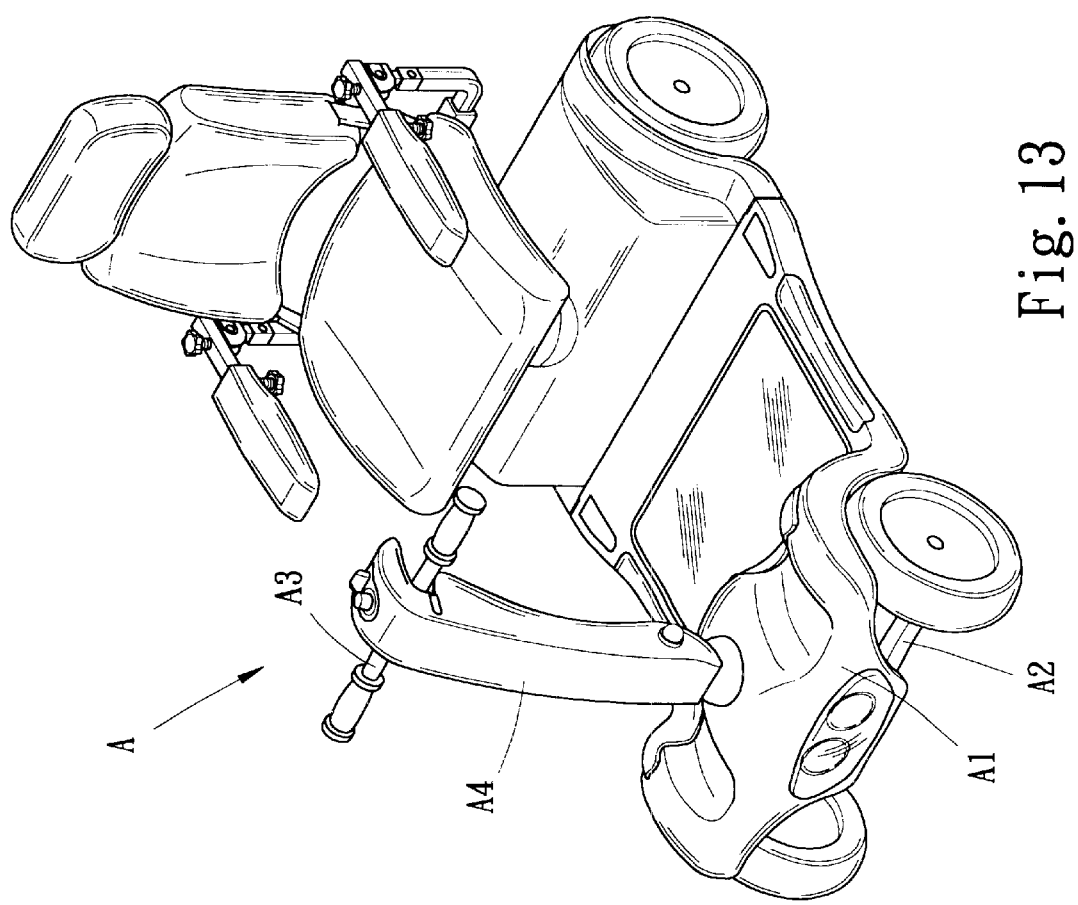
FIG. 13 is a perspective of an electric cart having a conventional covering panel.
Figure 14:
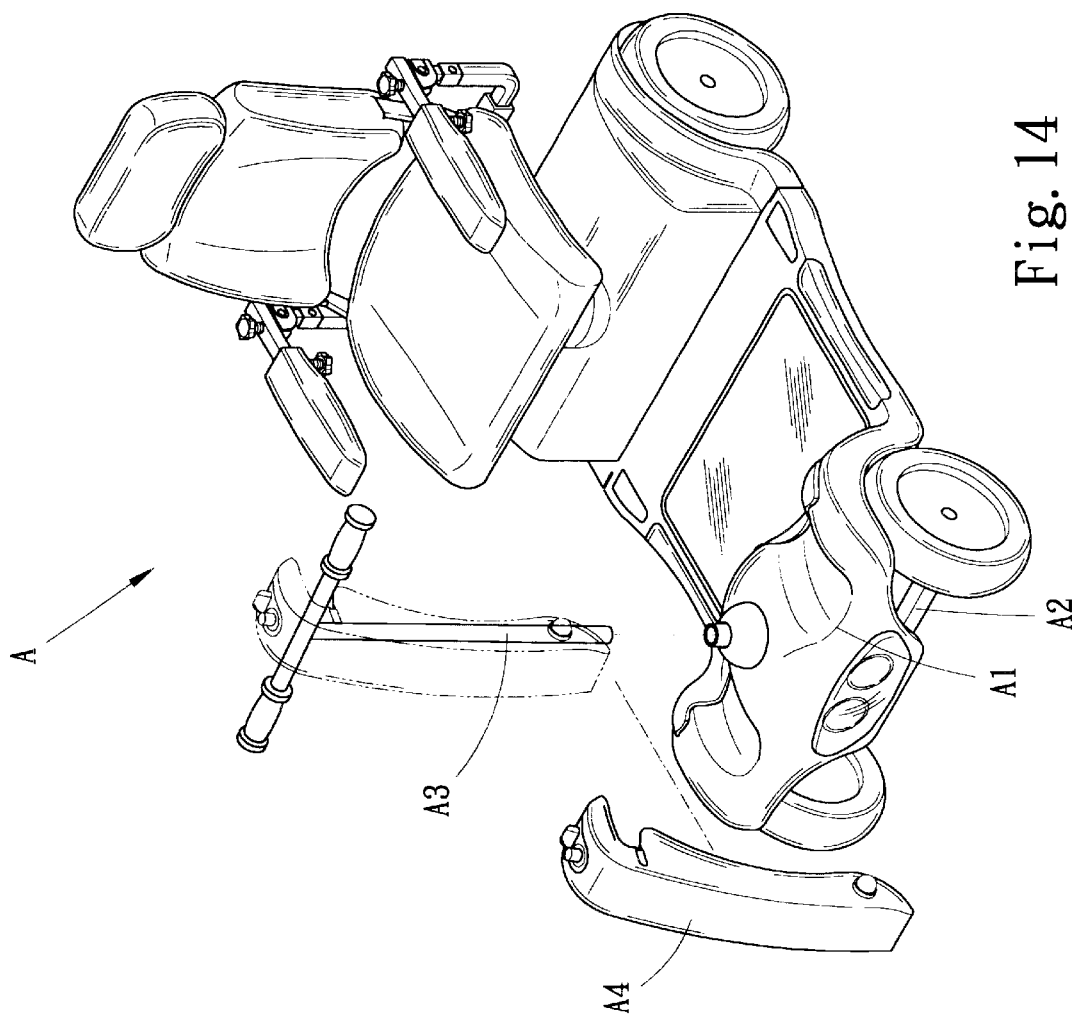
FIG. 14 shows the manner of dismounting handlebar and handlebar decorative panel from the electric cart of FIG. 13 before dismounting the conventional covering panel from the chassis of the cart.

The covering panel 100 may also be decorated with other materials. In FIGS. 10 and 11, a footrest panel 90 is attached to the raised front portion of the covering panel 100 in front of the seat 230 to protect the covering panel 100 from easily wearing off due to frequent frictional contact of a driver's feet with the covering panel 100. The footrest panel 90 may be of any shape so long as it well matches with the color and/or shape of the covering panel 100. To connect the footrest panel 90 to the covering panel 100, the footrest panel 90 may be provided at a backside with a plurality of studs 91 for engaging with the mounting holes 60 provided on the covering panel 100.

Moreover, a mat 300 may be detachably connected to the covering panel 100 via the mat fixing strips 80 to cover the portion of the covering panel 100 directly in front of the seat 230.

The following are some advantages of the fast-dismountable covering panel of the present invention:

1. The covering panel 100 and the chassis 200 may be separately fabricated and assembled that allows the manufacture, assembling and quality control of the electric cart to be performed at largely reduced time and labor.

2. The covering panel 100 needs not to be assembled to the chassis 200 until the chassis 200, the handlebar stem 210 and all other related components, such as brake cable, electric control wirings, etc., have been assembled together and checked with respect to overall quality of the electric cart. There is no need to repeatedly mount and dismount the handlebar stem 210, the brake cable or the electric control wirings during QC process of the electric cart. Second time mistakes possibly occurring in re-assembling dismounted components can therefore be avoided.

3. Since the covering panel 100 may be elastically separated along the slit 30 and quickly dismounted from the chassis 200, replacement of an original covering panel 100 with other covering panel 100 of different color and style can be easily performed to meet customer's satisfaction. This gives manufacturers and consumers more flexibility and choices in producing and purchasing the electric carts.

The prevent invention as illustrated in FIGS. 1 through 12 provides a simplest way to produce the electric cart at largely reduced time, labor and other costs without largely changing the structure of the electric cart. The fast-dismountable covering panel of the present invention for the electric cart also minimizes the chances of second time mistakes occurred in re-assembling components of the cart dismounted during quality inspections.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A fast-dismountable covering panel for an electric cart having a chassis onto which said covering panel is mounted, said covering panel comprising a raised front portion provided at a top central area with a round opening, a substantially flat rear portion that extends from a lower rear end of said raised front portion and provided at a rear end thereof with an elongate opening that is adapted to engage with a handlebar stem that extends upward vertically from a front end of said chassis, and a very narrow slit provided along a centerline of said covering panel to extend between said round opening and said elongate opening, allowing said covering panel to be elastically stretched apart at said elongate opening along said slit; whereby when said elongate opening is engaged with said handlebar stem and said covering panel is elastically stretched apart along said slit, it is possible to push said covering panel against the chassis with said handlebar stem moving forward along said slit into said round opening of said covering panel to firmly engage therewith, causing said covering panel to mount onto and cover a top of said chassis.

2. A fast-dismountable covering panel for an electric cart as claimed in claim 1, and further comprising a coupler mountable to the handlebar stem, and wherein said round opening on said covering panel is attachable to said handlebar stem via said coupler.

3. A fast-dismountable covering panel for an electric cart as claimed in claim 2, wherein said coupler includes a top hole through which said handlebar stem is extendable, and at least one annular groove around a lower outer periphery of said coupler for engaging a circular edge of said round opening.

4. A fast-dismountable covering panel for an electric cart as claimed in claim 1, wherein said slit on said covering panel is sealed with a gasket.

5. A fast-dismountable covering panel for an electric cart as claimed in claim 4, wherein said gasket has an I-shaped cross section.

6. A fast-dismountable covering panel for an electric cart as claimed in claim 4, wherein said gasket defines at two lateral sides two longitudinally extended grooves adapted to engage edges of said covering panel adjacent to two sides of said slit.

7. A fast-dismountable covering panel for an electric cart as claimed in claim 5, wherein said gasket defines at two lateral sides two longitudinally extended grooves adapted to engage edges of said covering panel adjacent to two sides of said slit.

8. A fast-dismountable covering panel for an electric cart as claimed in claim 1, wherein said elongate opening on said covering panel is shaped to conform to a shape of a main post of said chassis.

9. A fast-dismountable covering panel for an electric cart as claimed in claim 1, wherein said covering panel is provided at said flat rear portion and said raised front portion with a plurality of mounting holes respectively for detachably connecting said flat rear portion of said covering panel to said chassis and a footrest panel to said raised front portion of said covering panel.

10. A fast-dismountable covering panel for an electric cart as claimed in claim 9, wherein said footrest panel is provided at a backside with a plurality of studs for engaging said mounting holes on said raised front portion of said covering panel.

11. A fast-dismountable covering panel for an electric cart as claimed in claim 1, wherein said covering panel is provided on a top surface of said flat rear portion with a plurality of mat fixing strips for detachably connecting a mat thereto.

12. A fast-dismountable covering panel for an electric cart as claimed in claim 11, wherein said mat fixing strips comprise hook and loop connectors.

* * * * *